United States Patent
Ko et al.

(10) Patent No.: US 12,493,339 B2
(45) Date of Patent: Dec. 9, 2025

(54) ELECTRONIC DEVICE AND PERFORMANCE OPTIMIZATION METHOD THEREOF

(71) Applicant: ASUSTeK COMPUTER INC., Taipei (TW)

(72) Inventors: Kuo Ko, Taipei (TW); Po-Han Cheng, Taipei (TW); Po-Hsin Chang, Taipei (TW); Huei-Ling Lai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 114 days.

(21) Appl. No.: 18/508,259

(22) Filed: Nov. 14, 2023

(65) Prior Publication Data

US 2024/0272696 A1 Aug. 15, 2024

(30) Foreign Application Priority Data

Feb. 14, 2023 (TW) .................................. 112105131

(51) Int. Cl.
*G06F 1/32* (2019.01)
*G06F 1/3212* (2019.01)
*G06F 1/3296* (2019.01)
*H02J 7/00* (2006.01)

(52) U.S. Cl.
CPC .......... *G06F 1/3212* (2013.01); *G06F 1/3296* (2013.01); *H02J 7/0048* (2020.01); *H02J 7/00714* (2020.01)

(58) Field of Classification Search
CPC ................. G06F 1/32; G06F 9/44; G06F 1/12
See application file for complete search history.

(56) References Cited

U.S. PATENT DOCUMENTS

| | | | | |
|---|---|---|---|---|
| 2006/0242439 | A1* | 10/2006 | Hupman | G06F 1/3203 713/320 |
| 2013/0339757 | A1* | 12/2013 | Reddy | G06F 1/3212 713/300 |
| 2018/0368223 | A1* | 12/2018 | Johnson | H05B 45/3725 |
| 2019/0073012 | A1 | 3/2019 | Sultenfuss et al. | |

FOREIGN PATENT DOCUMENTS

CN 111208896 5/2020

* cited by examiner

*Primary Examiner* — Keshab R Pandey
(74) *Attorney, Agent, or Firm* — JCIPRNET (57) ABSTRACT

An electronic device and a performance optimization method thereof are provided. The electronic device includes a battery module, a processor and a controller. The battery module is configured to supply power to the electronic device. The processor has a power consumption limit. In a power connection state, the controller determines whether to disable a power consumption limit adjustment function of the processor according to a source power provided by a power adapter and a system performance use setting of the electronic device. When the power consumption limit adjustment function is disabled, the processor executes an application program to monitor a storage capacity of the battery module and adjusts the system performance usage setting according to the storage capacity.

20 Claims, 5 Drawing Sheets

ELECTRONIC DEVICE AND PERFORMANCE OPTIMIZATION METHOD THEREOF

CROSS-REFERENCE TO RELATED APPLICATION

This application claims the priority benefit of Taiwan application serial no. 112105131, filed on Feb. 14, 2023. The entirety of the above-mentioned patent application is hereby incorporated by reference herein and made a part of this specification.

BACKGROUND

Technical Field

The disclosure relates to an electronic device for dynamically adjusting a system performance and a performance optimization method thereof.

Description of Related Art

Today's handheld electronic products (such as notebook computers, mobile phones and tablet computers) are supplied with power adapters and built-in or external batteries when they are ready for sale. Due to cost considerations, a power adapter with a lower wattage may be included, which limits a performance of the product. Therefore, in some product designs, while being powered by the power adapter, an internal or external battery is also used to provide additional power to enhance a system performance. However, in the case of long-term use of high system performance, the built-in or external battery cannot be charged and is continuously discharged. Once the user temporarily needs to move a location and pulls out the power adapter, a battery storage capacity may be only 5% to 0%, resulting in a poor user experience.

SUMMARY

The disclosure provides an electronic device including a battery module, a processor and a controller. The battery module is configured to supply power to the electronic device. The processor has a power consumption limit. The controller is coupled to the battery module and the processor. In a power connection state, the controller determines whether to disable a power consumption limit adjustment function of the processor according to a source power provided by a power adapter and a system performance usage setting of the electronic device. In response to the power consumption limit adjustment function being disabled, the processor executes an application program to monitor a storage capacity of the battery module and adjusts the system performance usage setting according to the storage capacity.

The disclosure further provides a performance optimization method adapted to an electronic device including a processor and a battery module. The method includes: in a power connection state, determining whether to disable a power consumption limit adjustment function of the processor according to a source power provided by a power adapter and a system performance usage setting of the electronic device; executing an application program to monitor a storage capacity of the battery module in response to the power consumption limit adjustment function being disabled and adjusting the system performance usage setting according to the storage capacity.

Based on the above description, the electronic device and its performance optimization method of the disclosure may dynamically adjust the system performance of the electronic device with reference of the storage capacity of the battery module, and achieve a balance between power consumption and performance. In this way, it not only allows users to maintain a high system performance environment for a certain period of time, but also avoids the dilemma of low battery power, so that the users may have a better user experience.

To make the aforementioned more comprehensible, several embodiments accompanied with drawings are described in detail as follows.

BRIEF DESCRIPTION OF THE DRAWINGS

FIG. 3A to FIG. 3C are flowcharts of a performance optimization method according to an embodiment of the disclosure.

DESCRIPTION OF THE EMBODIMENTS

Figure 1:
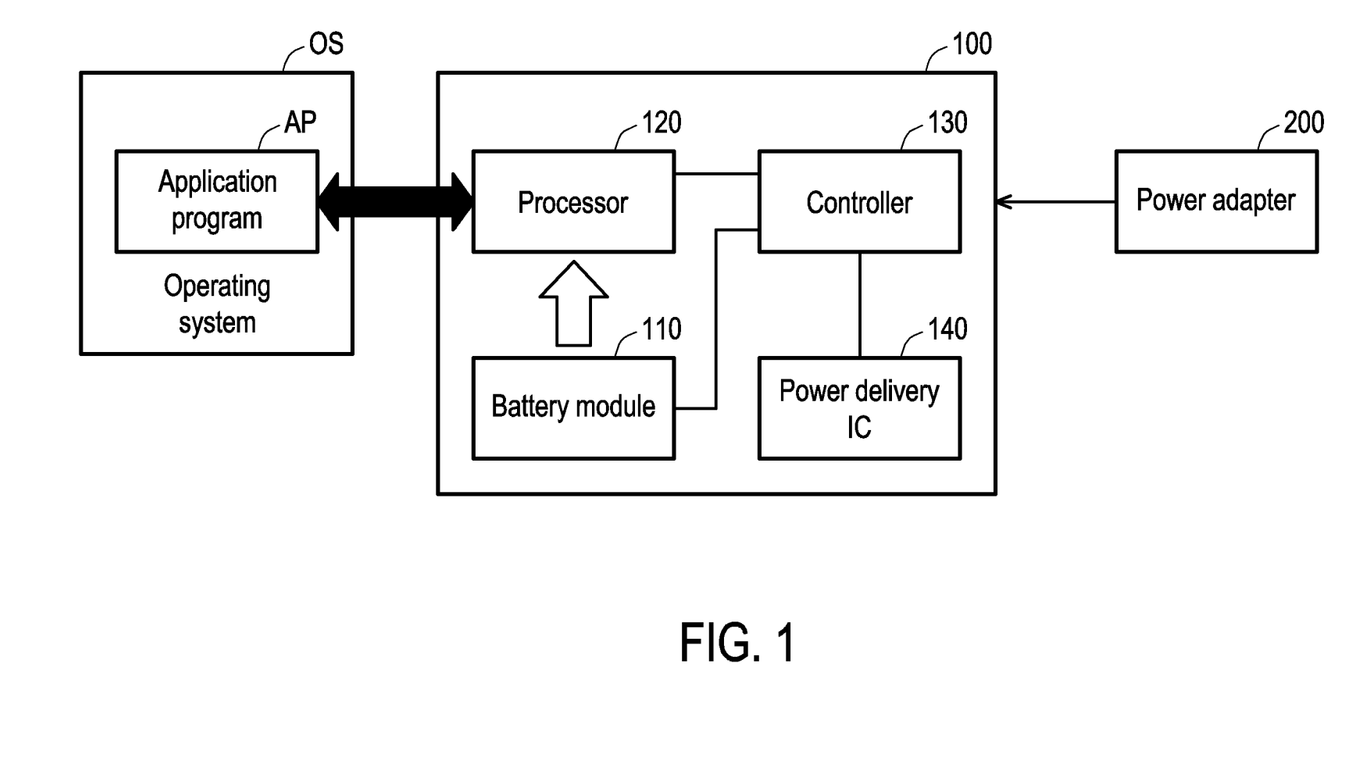
FIG. 1 is a schematic block diagram of an electronic device according to an embodiment of the disclosure.

Referring to FIG. 1, an electronic device 100 of the embodiment is, for example, a handheld electronic product such as a notebook computer, a mobile phone, a tablet computer, etc. The electronic device 100 includes a battery module 110, a processor 120, a controller 130 and a power delivery IC 140.

The battery module 110 may be used to power the electronic device 100, and may be a built-in or external battery module. The battery module 110 includes, for example, a battery cell set and a control circuit. A battery cell set is, for example, composed of one or more battery cells. The control circuit includes, for example, a battery gauge IC, which may calculate a storage capacity and a charging and discharging current of the battery module 110. In the embodiment, in response to the battery module 110 being charged by a power adapter 200 to be in a charging state, the battery gauge IC may report that the charging and discharging current is a positive value, and in response to the battery module 110 supplying power to the electronic device 100 to be in a discharging state, the battery gauge IC may report that the charging and discharging current is a negative value.

The processor 120 is, for example, a central processing unit (CPU), or other programmable general purpose or special purpose microprocessor, digital signal processor (DSP), programmable controller, application specific integrated circuit (ASIC) or other similar components or a combination of the above components. Processor 120 has a power consumption limit. The power consumption limit in the embodiment is, for example, a long duration power consumption limit PL1 specified in a package power management specification of Intel, and a unit thereof is watts. After the electronic device 100 enters an operating system OS, the processor 120 may also load an application program AP from the memory and execute the same, so as to monitor a storage capacity of the battery module 110 through the operating system OS. The application program AP is, for example, system performance control software developed by product developers, which is executed on the operating system OS and may perform related settings of performance optimization, screen brightness adjustment, or battery life, etc.

The controller 130 is coupled to the battery module 110, the processor 120 and a power delivery IC (PD IC) 140. The controller 130 is, for example, a programmable chip such as an embedded controller (EC) or a microcontroller etc., capable of exchanging data and communicating with the battery module 110 and the power delivery IC 140 through a communication protocol. The controller 130 may be used to monitor a charging and discharging current of the battery module 110. The communication protocol is, for example, a system management bus (SMBus) or an inter-integrated circuit (I²C), but the embodiment is not limited thereto.

The power adapter 200 is, for example, an AC adapter. In the embodiment, in response to the power adapter 200 being inserted into the electronic device 100, the electronic device 100 may be in a power connection state indicating that the power adapter 200 is connected. In addition, in response to the power adapter 200 being pulled out from the electronic device 100, the electronic device 100 releases the power connection state.

In the embodiment, the controller 130 may dynamically adjust the system performance of the electronic device 100 according to the storage capacity of the battery module 110, thereby perform performance and heat dissipation optimization. The following examples illustrate detailed steps of a performance optimization method of the disclosure.

Figure 2:
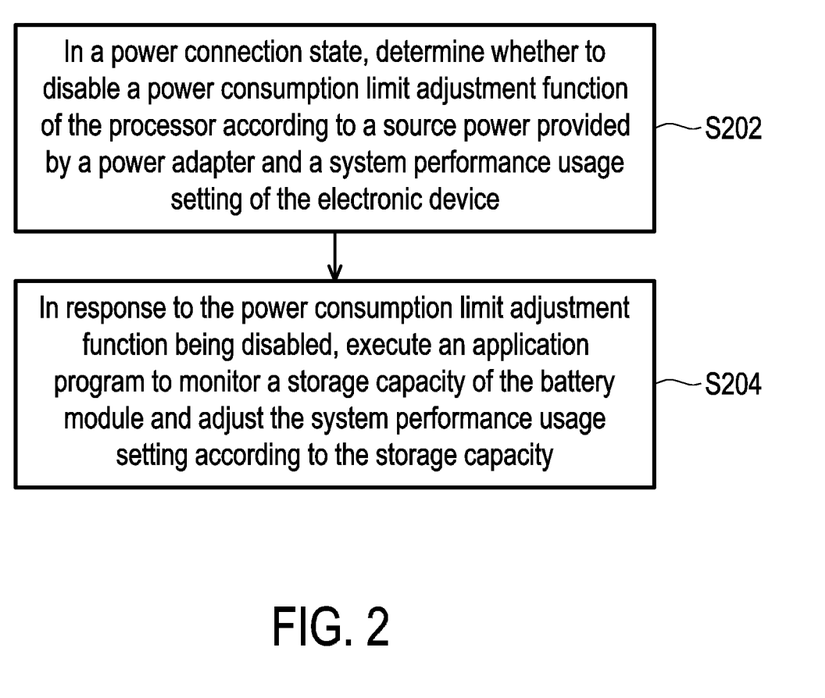
FIG. 2 is a flowchart of a performance optimization method according to an embodiment of the disclosure.

Referring to FIG. 1 and FIG. 2 at the same time, the method of the embodiment may be applied to the electronic device 100 in FIG. 1, and steps of the method are described as follows:

In step S202, in the power connection state, the controller 130 determines whether to disable the power consumption limit adjustment function of the processor 120 according to a source power provided by the power adapter 200 and a system performance usage setting of the electronic device 100. In the embodiment, the system performance usage setting may be set to, for example, three modes of a performance mode, a standard mode, and an energy saving mode. In the performance mode, for example, the performance and heat dissipation capability of the electronic device 100 may be maximized (the power consumption limit of the processor 120 and a fan speed are adjusted to maximum values) to handle high-load work (such as playing computer or mobile games). In the standard mode, for example, the performance and heat dissipation capability of the electronic device 100 may be adjusted according to general daily use conditions (such as processing files or sending and receiving emails). The energy-saving mode is, for example, a mode that aims at quietness, energy saving and power saving, and may provide all-day battery service. A user may manually set suitable system performance usage settings according to different usage scenarios through the application program AP or shortcut keys on a keyboard of the electronic device 100.

In addition, the so-called power consumption limit adjustment function, for example, refers to a processor function that automatically adjusts the long duration power consumption limit PL1 with a goal of not reducing the storage capacity of the battery module 110 in the power connection state. In brief, when such function is enabled, if it is found that the source power provided by the power adapter 200 is not enough, the long duration power consumption limit PL1 is automatically reduced to lower the performance of the processor 120, so that the storage capacity of the battery module 110 does not drop significantly. Comparatively, if the electronic device 100 is desired to maintain a high performance for a certain period of time even when the source power is insufficient, the power consumption limit adjustment function of the processor 120 has to be disabled.

The controller 130 may first determine whether the electronic device 100 is in the power connection state. In response to the electronic device 100 being in the power connection state, the controller 130 starts to analyse the source power provided by the power adapter 200 and the system performance usage setting of the electronic device 100 for judgment and adjustment. A detailed implementation of step S202 may be deduced by referring to each step in FIG. 3A to FIG. 3C.

Referring to FIG. 1 and FIG. 3A to FIG. 3C at the same time, in step S302, in the power connection state, the controller 130 determines whether the power adapter 200 is inserted into the electronic device 100 through a type-C interface. The type-C interface is, for example, a hardware connection interface conforming to a type-C communication standard of the universal serial bus (USB).

Figure 3A:
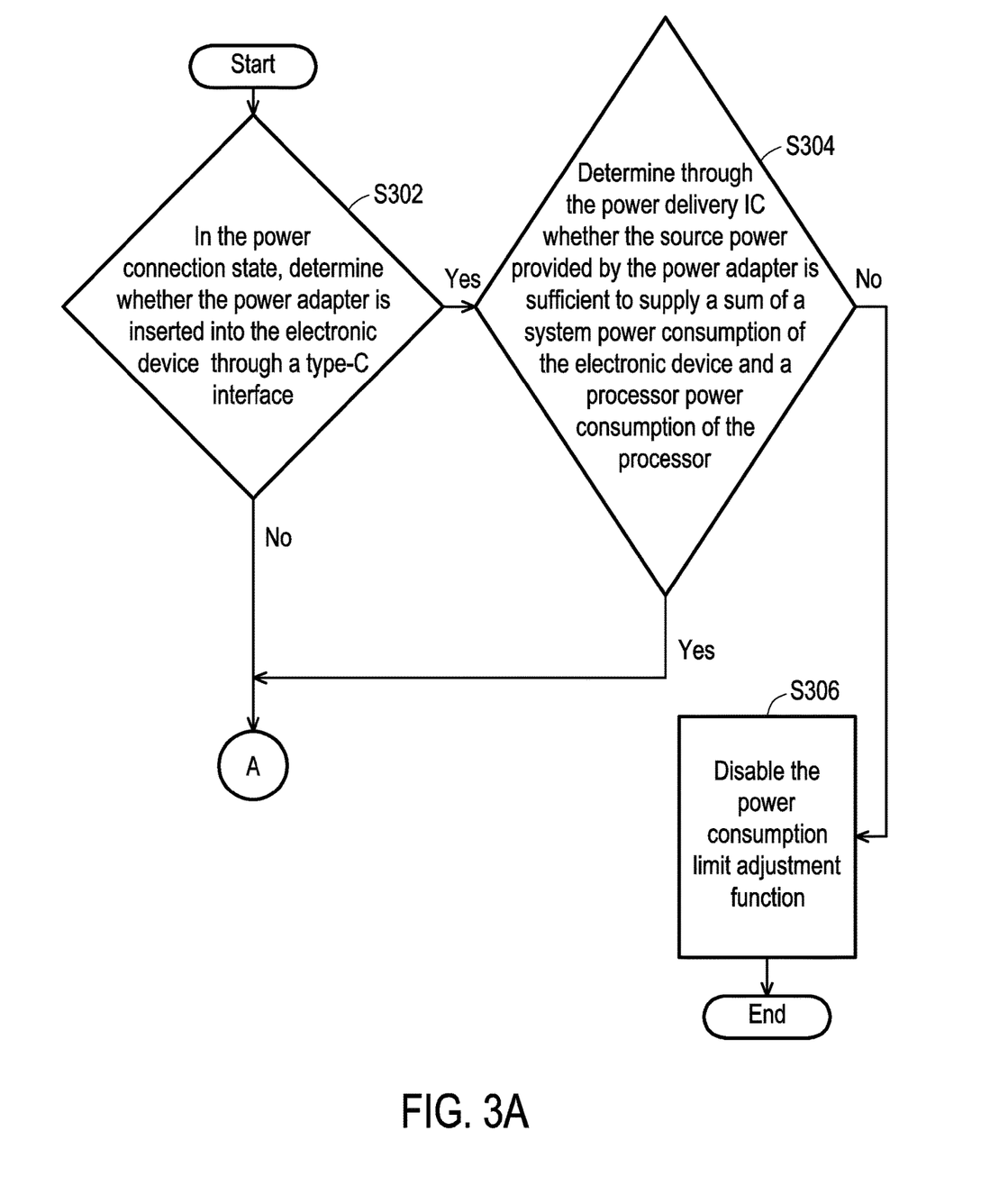

In response to the power adapter 200 being inserted into the electronic device 100 through the type-C interface, in step S304, the controller 130 determines through the power delivery IC 140 whether the source power provided by the power adapter 200 is sufficient to supply a sum of a system power consumption of the electronic device 100 and a processor power consumption of the processor 120. In the embodiment, the system power consumption is, for example, a power consumed by an internal system platform of the electronic device 100 (for example, 45 watts, 65 watts, or 90 watts), and the processor power consumption is, for example, a power consumed by the processor 120 (for example, 15 watts, 28 watts or 45 watts).

In response to the source power not being enough to supply the sum of the system power consumption of the electronic device 100 and the processor power consumption of the processor 120, in step S306, the power delivery IC 140 notifies the controller 130 to disable the power consumption limit adjustment function of the processor 120.

Figure 3B:
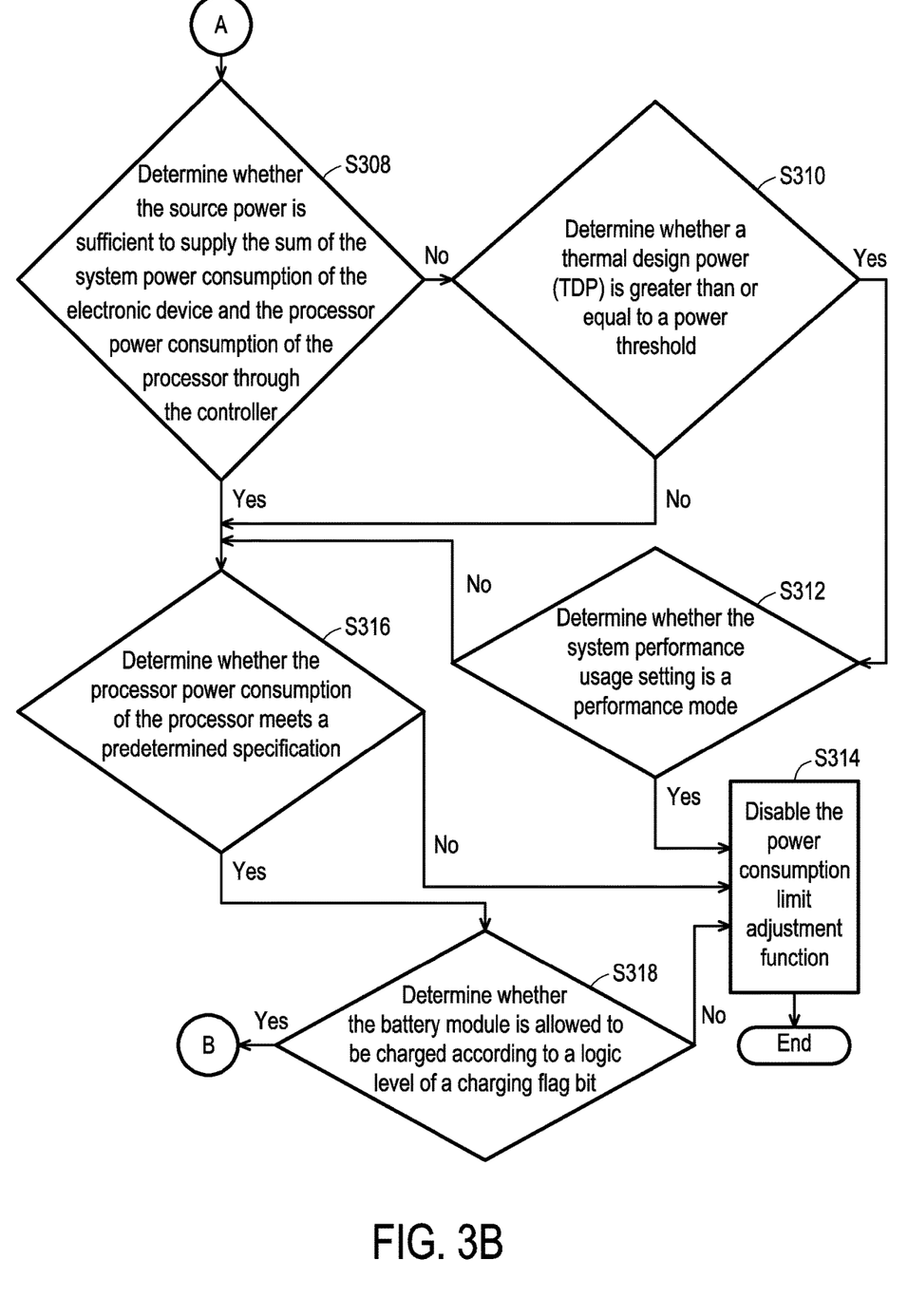

In response to the source power being sufficient to supply the sum of the system power consumption of the electronic device 100 and the processor power consumption of the processor 120, the process proceeds to step S308 of FIG. 3B through a step node A.

In addition, if the controller 130 determines in step S302 that the power adapter 200 is not plugged into the electronic device 100 through the type-C interface (for example, through a DC Jack), then the process directly proceeds to step S308 of FIG. 3B through the step node A.

In step S308, the controller 130 determines whether the source power provided by the power adapter 200 is sufficient to supply the sum of the system power consumption of the electronic device 100 and the processor power consumption of the processor 120.

In response to the source power not being enough to supply the sum of the system power consumption of the electronic device 100 and the processor power consumption of the processor 120, in step S310, the controller 130 determines whether a thermal design power (TDP) is greater than or equal to a predetermined power threshold. In the embodiment, a magnitude of the power threshold may depend on a specification of the processor 120 (for example, the processor power consumption), for example, 45 watts, but the disclosure is not limited thereto.

In response to the thermal design power of the processor 120 being greater than or equal to the power threshold, in step S312 the controller 130 determines whether the system performance usage setting of the electronic device 100 is the performance mode. If yes, the controller 130 disables the power consumption limit adjustment function of the processor 120 in step S314. If not, the process proceeds to step S316.

In addition, in step S308, if the controller 130 determines that the source power provided by the power adapter 200 is sufficient to supply the sum of the system power consumption of the electronic device 100 and the processor power consumption of the processor 120, then the process directly proceeds to step S316.

In step S310, if the controller 130 determines that the thermal design power of the processor 120 is not greater than or equal to the predetermined power threshold, the process also proceeds to step S316.

In step S316, the controller 130 determines whether the processor power consumption of the processor 120 meets a predetermined specification. In detail, a product developer may decide to let some processors that do not meet the predetermined specification to disable their power consumption limit adjustment function, so that the controller 130 may determine whether the processor power consumption of the processor 120 meets the predetermined specification (for example, greater than 45 watts), to as to filter out the processors whose power consumption limit adjustment function is to be disabled. In response to the processor power consumption of the processor 120 not meeting the predetermined specification, in step S314, the controller 130 disables the power consumption limit adjustment function of the processor 120.

In response to the processor power consumption of the processor 120 meeting the predetermined specification, in step S318, the controller 130 determines whether the battery module 110 is allowed to be charged according to a logic level of a charging flag bit. Regarding the charging flag bit, the controller 130 may control the charging flag bit according to a charging standard set by the user through an application program related to power management. For example, the user may set the charging standard to 60%, 80% or 100% through the application program of power management. Taking the charging standard set as 60% as an example, in response to the storage capacity of the battery module 110 not reaching 60% (for example, lower than 58%), the charging flag bit remains at logic 0 (a low logic level). In response to the controller 130 detecting that the storage capacity of the battery module 110 reaches or exceeds 60%, the controller 130 may set the charging flag bit to logic 1 (a high logic level). Therefore, in response to the charging flag bit being logic 0, the controller 130 may determine that the battery module 110 is allowed to be charged, and in response to the charging flag bit being logic 1, the controller 130 may determine that the battery module 110 is not allowed to be charged.

In response to the battery module 110 not being allowed to be charged (the charging flag bit is logic 1, indicating that there is enough storage capacity), in step S314, the controller 130 disables the power consumption limit adjustment function of the processor 120.

Figure 3C:
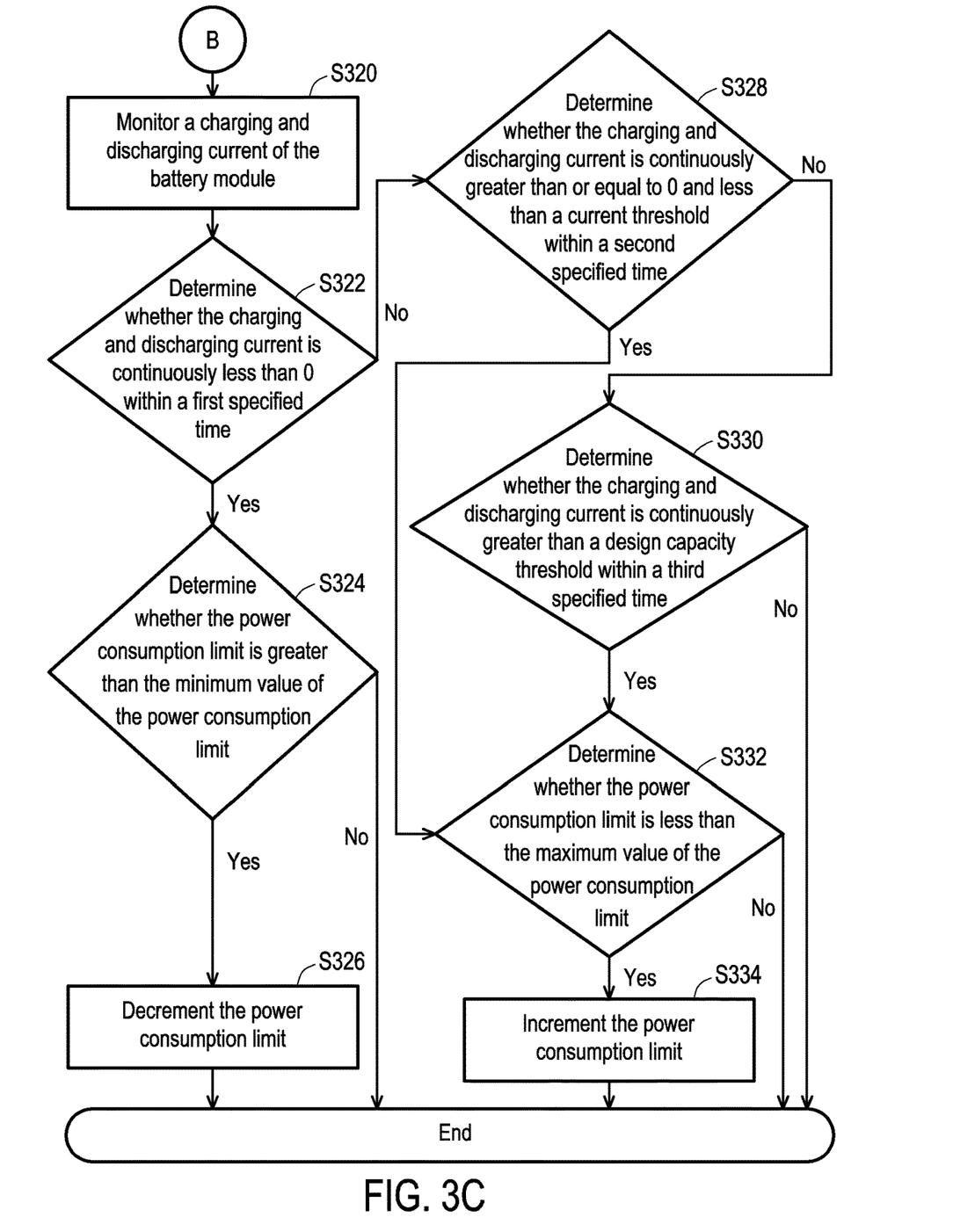

In response to the battery module 110 not being allowed to be charged (the charging flag bit is logic 0), the process proceeds to step S320 of FIG. 3C through a step node B. In step S320, the controller 130 monitors the charging and discharging current of the battery module 110. For example, the battery gauge IC in the battery module 110 may report a current value of the charging and discharging current to the controller 130 every 0.25 seconds. After the controller 130 collects 4 current values at an interval of 0.25 seconds, the 4 current values may be averaged as the current value of the charging and discharging current of the current second, and the charging and discharging current of the next second may be continuously monitored in the same way.

In step S322, the controller 130 determines whether the charging and discharging current is continuously less than 0 within a first specified time. The first predetermined time is, for example, 10 seconds to determine a steady state of the charging and discharging current. In response to the charging and discharging current being continuously less than 0 within the first specified time, it means that the battery module 110 is in a discharging state. In step S324, the controller 130 may determine whether the power consumption limit is greater than the minimum value of the power consumption limit (for example, the minimum value that the long duration power consumption limit PL1 may be adjusted to in the system of the electronic device 100). If yes, in step S326, the controller 130 decrements the power consumption limit, i.e., subtracts 1 watt from the current power consumption limit. If not, the process ends directly without adjusting the power consumption limit.

In step S322, if the controller 130 determines that the charging and discharging current is not continuously less than 0 within the first specified time, it means that the battery module 110 is in a charging state. In step S328, the controller 130 determines whether the charging and discharging current is continuously greater than or equal to 0 and less than a current threshold within a second specified time. The second specified time is, for example, 50 seconds, and the current threshold is, for example, 50 mA. If not, it means that the battery module 110 is not in a trickle charging state, and in step S330, the controller 130 determines whether the charging and discharging current is continuously greater than a design capacity threshold within a third specified time. The third specified time is, for example, 10 seconds to determine the steady state of the charging and discharging current. The design capacity threshold is, for example, a value obtained by multiplying a design capacity of the battery cell set in the battery module 110 by 0.07.

In response to the charging and discharging current being continuously greater than the design capacity threshold within the third specified time, in step S332, the controller 130 may determine whether the power consumption limit is less than the maximum value of the power consumption limit (for example, the maximum value that the long duration power consumption limit PL1 may be adjusted to in the system of the electronic device 100). If yes, in step S334, the controller 130 increments the power consumption limit, i.e., increases the current power consumption limit by 1 watt. If not, the process ends directly without adjusting the power consumption limit.

In step S330, if the controller 130 determines that the charging and discharging current is not continuously greater than the design capacity threshold within the third specified time, the process ends directly without adjusting the power consumption limit.

On the other hand, in step S328, if the controller 130 determines that the charging and discharging current is continuously greater than or equal to 0 and less than the current threshold within the second specified time, it means that the battery module 110 is in the trickle charging state. At this time, in order to avoid poor system performance due to the failure in full charging of the battery module 110, the process also proceeds to step S332 to increment the power consumption limit.

Then, returning to FIG. 2, in step S204, in response to the power consumption limit adjustment function being disabled, the processor 120 executes the application program AP to monitor the storage capacity of the battery module 110 and adjusts the system performance usage setting of the electronic device 100 according to the storage capacity. In detail, since the power consumption limit adjustment function of the processor 120 has been disabled, in response to the system performance usage setting being set to the performance mode, the battery module 110 is allowed to be temporarily in the discharging state, so as to work together with the power adapter 200 to supply electric power required by the electronic device 100. In response to the storage capacity of the battery module 110 being lower than a capacity threshold, the application program AP may notify the processor 120 that the current storage capacity of the battery module 110 is too low, and the processor 120 may automatically switch the system performance usage setting to the standard mode to reduce the performance of the processor 120, so that the battery module 110 is changed to the charging state until the user manually switches the system performance usage setting to the performance mode again. The capacity threshold is, for example, 40% of the design capacity of the battery cell set in the battery module 110, which may be set by the user through the application program AP. In some embodiments, in response to the storage capacity of the battery module 110 being lower than the capacity threshold, the processor 120 may also automatically switch the system performance usage setting to the energy-saving mode, which also makes the battery module 110 to be in the charging state.

In addition, in response to the power adapter 200 being pulled out and the electronic device 100 is released from the power connection mode, the controller 130 may adjust the power consumption limit to a predetermined value, so as to continue processing when entering the power connection mode next time. The predetermined value is, for example, 34 watts, which is equal to the maximum value that the long duration power consumption limit PL1 may be adjusted to, so that the processor 120 may play a higher performance. In an embodiment, the maximum value of the long duration power consumption limit PL1 is also equal to a short duration power consumption limit PL2 stipulated in Intel's package power management specification.

In summary, the electronic device and its performance optimization method of the disclosure may dynamically adjust the system performance of the electronic device with reference of the storage capacity of the battery module. With the assistance of the application program, once the storage capacity is too low, the system performance usage setting is automatically switched to the standard mode. In this way, it not only allows users to maintain a high system performance environment for a certain period of time, but also avoids the dilemma of low battery power, so that the users may have a better user experience.

What is claimed is:

1. An electronic device, comprising:
   a battery module, configured to supply power to the electronic device;
   a processor, having a power consumption limit; and
   a controller, coupled to the battery module and the processor, wherein in a power connection state, the controller determines whether to disable a power consumption limit adjustment function of the processor according to a source power provided by a power adapter and a system performance usage setting of the electronic device,
   in response to the power consumption limit adjustment function being disabled, the processor executes an application program to monitor a storage capacity of the battery module and adjusts the system performance usage setting according to the storage capacity.

2. The electronic device according to claim 1, wherein in response to the storage capacity being lower than a capacity threshold, the processor switches the system performance usage setting to a standard mode, so that the battery module is in a charging state.

3. The electronic device according to claim 1, wherein the controller determines whether the source power is sufficient to supply a sum of a system power consumption of the electronic device and a processor power consumption of the processor, and if not, the controller determines whether a thermal design power of the processor is greater than or equal to a power threshold.

4. The electronic device according to claim 3, wherein in response to the thermal design power being greater than or equal to the power threshold, the controller determines whether the system performance usage setting is a performance mode, and in response to the system performance usage setting being the performance mode, the controller disables the power consumption limit adjustment function.

5. The electronic device according to claim 1, further comprising a power delivery IC coupled to the controller,
   wherein in response to the power adapter being inserted into the electronic device through a type-C interface, the power delivery IC determines whether the source power is sufficient to supply a sum of a system power consumption of the electronic device and a processor power consumption of the processor, and if not, the power delivery IC notifies the controller to disable the power consumption limit adjustment function.

6. The electronic device according to claim 1, wherein the controller determines whether a processor power consumption of the processor meets a predetermined specification, and in response to the processor power consumption not meeting the predetermined specification, the controller disables the power consumption limit adjustment function.

7. The electronic device according to claim 1, wherein the controller determines whether the battery module is allowed to be charged according to a logic level of a charging flag bit, and in response to the battery module not being allowed to be charged, the controller disables the power consumption limit adjustment function.

8. The electronic device according to claim 1, wherein the controller monitors a charging and discharging current of the battery module, and determines whether the charging and discharging current is continuously less than 0 within a first specified time, and in response to the charging and discharging current being continuously less than 0 within the first specified time, the controller determines whether the power consumption limit is greater than a predetermined minimum value of the power consumption limit, and if yes, the controller decrements the power consumption limit.

9. The electronic device according to claim 8, wherein in response to the charging and discharging current not being continuously less than 0 within the first specified time, the controller determines whether the charging and discharging current is continuously greater than or equal to 0 and less than a current threshold within a second specified time,
   in response to the charging and discharging current being continuously greater than or equal to 0 and less than the current threshold within the second specified time, the controller determines whether the power consumption limit is less than a predetermined maximum value of the power consumption limit, and if yes, the controller increments the power consumption limit.

10. The electronic device according to claim 9, wherein in response to the charging and discharging current not being continuously greater than or equal to 0 and less than the current threshold within the second specified time, the controller determines whether the charging and discharging current is continuously greater than a design capacity threshold within a third specified time,
   in response to the charging and discharging current being continuously greater than the design capacity threshold within the third specified time, the controller determines whether the power consumption limit is less than the predetermined maximum value of the power consumption limit, and if yes, the controller increments the power consumption limit.

11. A performance optimization method, adapted to an electronic device comprising a processor and a battery module, the performance optimization method comprising:
   in a power connection state, determining whether to disable a power consumption limit adjustment function of the processor according to a source power provided by a power adapter and a system performance usage setting of the electronic device; and
   executing an application program to monitor a storage capacity of the battery module in response to the power consumption limit adjustment function being disabled and adjusting the system performance usage setting according to the storage capacity.

12. The performance optimization method according to claim 11, wherein adjusting the system performance usage setting according to the storage capacity comprises:
   in response to the storage capacity being lower than a capacity threshold, switching the system performance usage setting to a standard mode, so that the battery module is in a charging state.

13. The performance optimization method according to claim 11, wherein in the power connection state, determining whether to disable the power consumption limit adjustment function of the processor according to the source power provided by the power adapter and the system performance usage setting of the electronic device comprises:
   determining whether the source power is sufficient to supply a sum of a system power consumption of the electronic device and a processor power consumption of the processor; and
   if not, determining whether a thermal design power of the processor is greater than or equal to a power threshold.

14. The performance optimization method according to claim 13, wherein in the power connection state, determining whether to disable the power consumption limit adjustment function of the processor according to the source power provided by the power adapter and the system performance usage setting of the electronic device further comprises:
   in response to the thermal design power being greater than or equal to the power threshold, determining whether the system performance usage setting is a performance mode; and
   in response to the system performance usage setting being the performance mode, disabling the power consumption limit adjustment function.

15. The performance optimization method according to claim 11, wherein the electronic device further comprises a power delivery IC, and the performance optimization method further comprises:
   in response to the power adapter being inserted into the electronic device through a type-C interface, determining whether the source power is sufficient to supply a sum of a system power consumption of the electronic device and a processor power consumption of the processor through the power delivery IC; and
   if not, disabling the power consumption limit adjustment function.

16. The performance optimization method according to claim 11, further comprising:
   determining whether a processor power consumption of the processor meets a predetermined specification; and
   in response to the processor power consumption not meeting the predetermined specification, disabling the power consumption limit adjustment function.

17. The performance optimization method according to claim 11, further comprising:
   determining whether the battery module is allowed to be charged according to a logic level of a charging flag bit; and
   in response to the battery module not being allowed to be charged, disabling the power consumption limit adjustment function.

18. The performance optimization method according to claim 11, further comprising:
   monitoring a charging and discharging current of the battery module;
   determining whether the charging and discharging current is continuously less than 0 within a first specified time;
   in response to the charging and discharging current being continuously less than 0 within the first specified time, determining whether the power consumption limit is greater than a predetermined minimum value of the power consumption limit; and
   if yes, decrementing the power consumption limit.

19. The performance optimization method according to claim 18, further comprising:
   in response to the charging and discharging current not being continuously less than 0 within the first specified time, determining whether the charging and discharging current is continuously greater than or equal to 0 and less than a current threshold within a second specified time;
   in response to the charging and discharging current being continuously greater than or equal to 0 and less than the current threshold within the second specified time, determining whether the power consumption limit is less than a predetermined maximum value of the power consumption limit; and
   if yes, incrementing the power consumption limit.

20. The performance optimization method according to claim 19, further comprising:
   in response to the charging and discharging current not being continuously greater than or equal to 0 and less than the current threshold within the second specified time, determining whether the charging and discharging current is continuously greater than a design capacity threshold within a third specified time;
   in response to the charging and discharging current being continuously greater than the design capacity threshold within the third specified time, determining whether the power consumption limit is less than the predetermined maximum value of the power consumption limit; and
   if yes, incrementing the power consumption limit.

* * * * *